(No Model.)
F. T. MALLON.
CORN SHELLER.
No. 259,882. Patented June 20, 1882.
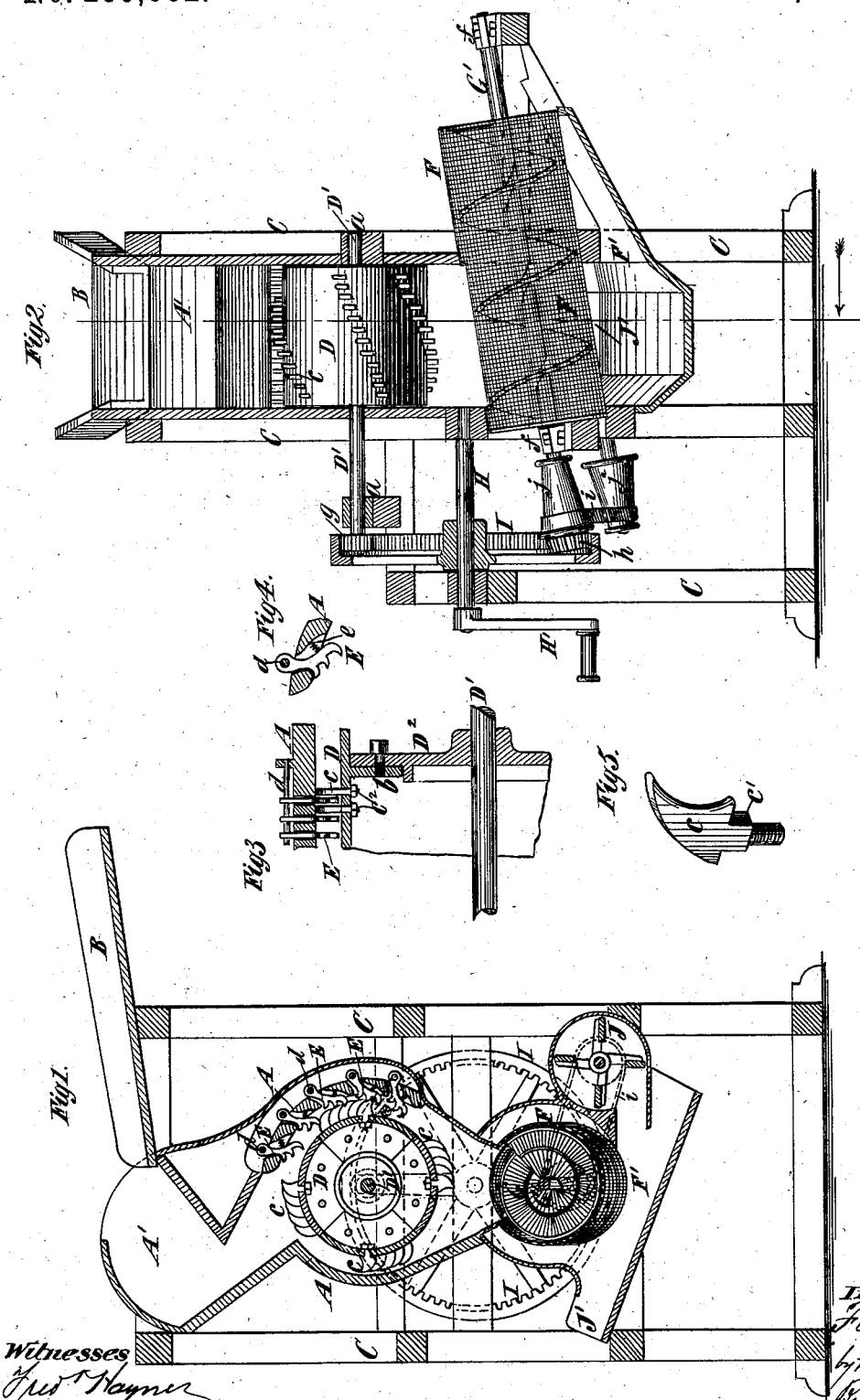
Witnesses
Fred Hayner
Ed. Moran
Inventor
F. T. Mallon
by his Attys
Brown & Brown

UNITED STATES PATENT OFFICE.

FRANCIS T. MALLON, OF PAWCATUCK, CONNECTICUT.

CORN-SHELLER.

SPECIFICATION forming part of Letters Patent No. 259,882, dated June 20, 1882.

Application filed April 14, 1882. (No model.)

*To all whom it may concern:*

Be it known that I, FRANCIS T. MALLON, of Pawcatuck Village, in the town of Stonington, county of New London, and State of Connecticut, have invented certain new and useful Improvements in Corn-Shellers, of which the following is a specification.

The invention consists in the combination, in a corn-sheller, with a casing and a rotary cylinder arranged therein, provided with teeth set in spiral rows or series, of toothed hooks in the casing, set at a sufficient distance apart to enable the teeth on the cylinder to pass between them, and springs acting upon the backs of said hooks to press them inward toward the cylinder, all as particularly hereinafter described and claimed.

The invention also consists in the combination, with the casing and cylinder, of hooked or curved teeth on the latter and pivoted toothed hooks in the former, supported by springs, as also hereinafter described and claimed.

In the accompanying drawings, Figure 1 represents a transverse vertical section of a corn-sheller embodying my invention. Fig. 2 represents a longitudinal vertical section thereof. Fig. 3 represents a partial longitudinal section of the cylinder on a larger scale. Fig. 4 represents a detail view of a portion of the casing and one of the pivoted hooks; and Fig. 5 represents a perspective view, upon a large scale, of one of the cylinder-teeth.

Similar letters of reference designate corresponding parts in all the figures.

A designates the casing, which is constructed to form a hopper, A', at the top, and the corn on the cob is delivered into said hopper by a chute or feeder, B.

C designates the frame of the machine, and D designates a cylinder, the shaft D' of which is mounted in bearings $a$ in the frame C. The cylinder D is represented in Fig. 3 as composed of two heads, D², only one of which is shown in Fig. 3, and arc-shaped sections forming the periphery, and provided with flanges $b$, through which bolts may be inserted for securing them to the heads D².

The cylinder D is provided with teeth $c$, which are arranged in spiral rows lengthwise of the cylinder, as clearly shown in Fig. 2, and the teeth here represented are hooked or curved, as shown in Fig. 5, and have rectangular shanks $c'$, which fit in correspondingly-shaped holes in cylinder, in which they are secured by nuts $c^2$, applied to the screw-threaded ends shown in Fig. 3.

In the casing A are arranged hooks E, which are provided on their inner surfaces with teeth, those here shown having three teeth. The hooks E are arranged in openings or holes in the casing, and as here represented they are suspended upon pivots $d$, upon which they may swing to enable them to move toward or recede from the cylinder. In this example of my invention the hooks E are represented as arranged in five horizontal series or rows, and the pivots of those of each row may be formed by a single rod; but any number of rows of hooks may be employed, and in lieu of being pivoted they may be movable bodily toward and from the cylinder, in which case they would be made in the form of blocks fitted and adapted to move in slots of proper form in the casing A. The hooks are impelled toward the cylinder each by a separate spring, $e$, arranged, as shown clearly in Fig. 4, between the back of the hook and the back of the opening in the casing, and by these springs the hooks are held with a yielding pressure. The cylinder-teeth $c$ work freely between the hooks E, and by the combined action of the two the corn is loosened and shelled from the cob in a very effective manner, and the corn and cobs are delivered through an opening at the bottom of the casing A. The springs $e$ hold the hooks E strongly enough to cause their teeth to act effectively on the corn, but allow the hooks to yield sufficiently to permit the cobs to pass between the casing and cylinder.

Below the casing A is arranged a screen, F, into which the shelled corn and cobs are delivered from the casing A through an opening in the top of the screen F at the bottom of the casing, as shown in Fig. 1. This screen is arranged in an inclined position, as shown in Fig. 2, and is closed at the lower end and open at the upper end, and below the screen is a box or receptacle, F', for the shelled corn.

In the screen F is a rotary worm or screw, G, the shaft G' of which is mounted in bearings $f$, and which is composed of reticulated or perforated material, so that corn may pass through its meshes or perforations.

H designates a driving-shaft, which may be operated by a crank, H', if the machine is to be operated by hand, or by a pulley and belt if it is to be operated by power, and upon this shaft is mounted an internal driving-gear, I, which engages with and rotates a spur-pinion, $g$, upon the shaft D' of the cylinder D, and a bevel-pinion, $h$, on the shaft G' of the worm or screw G, as clearly shown in Fig. 2. The worm or screw G is rotated in a direction to carry all the cobs and other materials upward toward and out through the open end of the screen F, while the shelled corn can pass readily through the meshes in the worm or screw, and thence passes through the said screen into the box or receptacle F'. This screen is made the subject of a separate application for Letters Patent filed April 21, 1882, and of which the serial number is 59,060. The shelled corn, in dropping from the screen F into the box or receptacle F', is subjected to a blast produced by a fan-blower, J, and thereby dust, particles of cob, and all light refuse will be separated from the shelled corn and carried off through an outlet-passage, J'.

The blower J may be operated from the shaft G' of the worm or screw by a belt, $i$, upon reversely-coned pulleys or drums $j$, and by shifting the belt the blower may be rotated at just the speed desired.

In order to shift the belt $i$ automatically, I may employ a rotary speed governor or regulator which I have invented, and which forms the subject of a separate application for Letters Patent filed April 14, 1882, and of which the serial number is 58,342.

What I claim as my invention, and desire to secure by Letters Patent, is—

1. In a corn-sheller, the combination, with the casing A and the cylinder D, provided with teeth set in spiral rows longitudinally thereof, of toothed hooks in the casing, set at a sufficient distance apart to enable the teeth to pass between them, and springs acting upon said hooks to press them inward independently of each other, substantially as herein described.

2. In a corn-sheller, the combination, with the casing A and cylinder D, of the hooked or curved teeth $c$, set in the cylinder, the toothed hooks E, pivoted in the casing and set at a sufficient distance apart to enable the teeth $c$ to pass between them, and springs $e$, applied to the hooks for pressing them inward, substantially as herein described.

FRANCIS T. MALLON.

Witnesses:
OWEN McGOWAN,
JOHN MALLON.